United States Patent [19]
Ito et al.

[11] Patent Number: 5,715,375
[45] Date of Patent: Feb. 3, 1998

[54] ROBOT CONTROL SYSTEM FOR EXECUTING MULTI-LAYER WELDING

[75] Inventors: Takayuki Ito; Akiko Takano, both of Yamanashi, Japan

[73] Assignee: Fanuc Ltd., Yamanashi, Japan

[21] Appl. No.: 492,545

[22] Filed: Jun. 20, 1995

[30] Foreign Application Priority Data

Jun. 23, 1994 [JP] Japan ................................. 6-163294

[51] Int. Cl.$^6$ ................................................. G05B 19/00
[52] U.S. Cl. ........................ 395/93; 395/94; 395/82
[58] Field of Search ............................. 395/80–87, 94, 395/93, 901; 219/86.7, 76.14, 124.34, 125.1; 901/1–8, 12

[56] References Cited

U.S. PATENT DOCUMENTS

| | | | |
|---|---|---|---|
| 4,508,953 | 4/1985 | Murakami et al. | 219/125.1 |
| 4,935,597 | 6/1990 | Zimmer | 219/124.34 |
| 5,173,592 | 12/1992 | Okumura et al. | 219/125.1 |
| 5,233,150 | 8/1993 | Schneebeli et al. | 219/76.14 |
| 5,449,875 | 9/1995 | Ito et al. | 219/86.7 |

Primary Examiner—Tariq R. Hafiz
Attorney, Agent, or Firm—Staas & Halsey

[57] ABSTRACT

A cylindrical workpiece as a welding object is rotated by an external drive shaft. A welding torch and a laser sensor are attached to a distal end portion of a robot. A deflective scanning laser beam from a laser sensor is projected on a region just ahead of a weld point, whereby a light spot trace is formed extending in a direction perpendicular to a welding center line. A CCD camera of the laser sensor picks up the trace, thereby detecting a change of the thickness of a weld layer. In executing a weaving operation, the robot performs an alternating motion including components in the direction perpendicular to the welding center line. When the workpiece rotates so that the range of projection of the laser beam, starting from a region without any weld layer thereon, reaches a region for the formation of a first weld layer, a layer transition is detected by an increase of the thickness of the weld layer. Based on this point of time, control is effected to execute correction of the robot position, modification of welding conditions, etc.

6 Claims, 7 Drawing Sheets

FIG. 5

FIXED-POSITION WEAVING LIST PICTURE

///////FIXED-POSITION WEAVING SETUP////////////////////////

| | LAYER NUMBER | ALLOWABLE VALUE (mm) | COMMENT | |
|---|---|---|---|---|
| 1 | 1 | $\beta 1$ | [ | ] |
| 2 | 2 | $\beta 2$ | [ | ] |
| 3 | 3 | $\beta 3$ | [ | ] |

FIG. 6

FIXED-POSITION WEAVING DETAIL PICTURE

///////FIXED-POSITION WEAVING SETUP////////////////////////

|   |   |   |   | COMMENT |   |
|---|---|---|---|---|---|
| 1 | CONDITION | 1 | | [ | ] |
| 2 | LAYER NUMBER | 3 | | [ | ] |
| 3 | ALLOWABLE VALUE | $\beta 1, \beta 2, \beta 3$ | | [ | ] |
| 4 | 1 CORRECTION FOR FIRST-TO-SECOND TRANSITION | | $X : x2, Y : y2, Z : z2$ | | |
| 5 | 2 CORRECTION FOR SECOND-TO-THIRD TRANSITION | | $X : x3, Y : y3, Z : z3$ | | |
| 6 | 1 FIRST-LAYER CONDITION | | $V : V1, I : I1$ | | |
| 7 | 2 SECOND-LAYER CONDITION | | $V : V2, I : I2$ | | |
| 8 | 3 THIRD-LAYER CONDITION | | $V : V3, I : I3$ | | |

FIG. 7

EXAMPLE OF OPERATION PROGRAM

```
1 : BY-AXIS [1]           100%  POSITIONING
2 : WEAVING SINE [1]
3 : ARC START
4 : STRAIGHT LINE [1]     100%  POSITIONING
5 : ARC END
6 : WEAVING END
7 : JOINT-FEED [2]        100%  POSITIONING
    [END]
```

ROBOT CONTROL SYSTEM FOR EXECUTING MULTI-LAYER WELDING

BACKGROUND OF THE INVENTION

1. Field of the Invention

The present invention relates to a robot control system for executing multi-layer arc welding for an object of welding by controlling a robot which is furnished with a welding torch.

2. Description of the Related Art

For welding a thick object of welding (hereinafter referred to as workpiece), multi-layer arc welding using fixed position weaving has been performed, in which the workpiece is moved with respect to a certain point and welded with a welding torch making reciprocation motion across or around that point so that a fixed position weaving welding may be carried out for the workpiece. After completing a weaving welding once for the workpiece in that manner, a second weaving welding is carried out in the same manner (that is, with a fixed position weaving welding) for the area (the first weld layer) once welded in the first welding to form a second weld layer above the first weld layer. Further, if necessary, other weaving weldings are repeated some times in the same manner for the same area.

In such a welding method, it is usual that a position of a welding torch with respect to the workpiece and/or welding condition including welding voltage and welding current are changed when shifting from the first layer welding to the second layer welding, or from the second layer welding to the third layer welding and so on.

Therefore, in order to carry out properly the multi-layer arc welding using fixed position weaving with a welding torch mounted on a robot, a robot control device, which controls the robot, must make preparations for welding for the next weld layer immediately before the robot actually starts the welding operation for the next weld layer. Thus, welding conditions and robot position must be changed to be suited to the welding for the next layer.

In the case where the robot is moved to execute welding without moving the workpiece, it can recognize the time for the completion of formation of one weld layer or the start of formation of another or next layer from the point of time when the robot reaches the end point or starting point of one welding path.

Also in the case where the welding path is formed by moving the workpiece (for rotation, translation, etc.) with respect to the robot, the robot control device can recognize the time of shift to the new weld layer from the displacement (rotational position, translative position, etc.) of the workpiece if an axis for the workpiece movement is an additional axis which is controlled by the robot control device. This system, however, entails a complicated teaching operation.

In the case where fixed-position weaving is executed by rotating a cylindrical workpiece without using any additional axis so that the welding path extends in the circumferential direction, on the other hand, if information (e.g., workpiece rotating speed, time, etc.) on the rotation control of the workpiece is detected by detecting means and is supplied to the robot control device, then the control device can be aware of the rotational position of the workpiece, so that it can realize the fact that the robot has reached the end point or starting point of one welding path. In other words, the robot control device can recognize the time of completion of formation of one layer or the start of formation of another layer. In practice, however, the rotating speed of the workpiece may vary at the start of operation or be changed using an override. It is difficult, therefore, to detect the rotational displacement and position of the workpiece accurately from the information on the rotating speed and time. When welding is started, moreover, the weld layer rises gradually. However, the position in which the layer on the workpiece attains a stable height cannot be seized from the information on the rotation of the workpiece only.

OBJECT AND SUMMARY OF THE INVENTION

The object of the present invention is to provide a robot control system for executing multi-layer arc welding based on weaving by controlling a robot which mounts a welding torch, while moving a workpiece with respect to the robot, in which the robot can seize the time when welding for the next layer is started and also recognize the order of the current layer accurately even in the case where the workpiece is driven irrespectively of the control of the robot control device.

A robot control system according to the present invention is characterized in that the time of when welding for one layer is shifted to welding for a next layer in multi-layer welding can be detected automatically by the result of measurement from a sensor which can measure the overall height of a multilayer weld.

According to fixed-position weaving welding in which a cylindrical workpiece is rotated around its axis as a welding torch is reciprocated on either side of a fixed point, in particular, the overall height of the multilayer weld gradually increases with an increase of the number of weld layer. Accordingly, the order of the current layer can be identified at once by measuring the height of the weld.

Thus, by immediately detecting the order of the current layer by using the sensor, the welding conditions can be changed readily into ones adapted for the layer concerned. These welding conditions include the position (in a work coordinate system) of the welding torch relative to the workpiece, welding current, welding voltage, etc.

BRIEF DESCRIPTION OF THE DRAWINGS

FIG. 5 is a diagram showing a picture for setting fixed-position weaving conditions displayed on a screen attached to a teaching control panel;

FIG. 6 is a diagram showing a picture indicative of details of the fixed-position weaving conditions displayed on the control panel screen;

FIG. 7 is a diagram showing an operation program for the robot to execute welding operation based on the fixed-position weaving;

DETAILED DESCRIPTION OF THE PREFERRED EMBODIMENT

Figure 1:
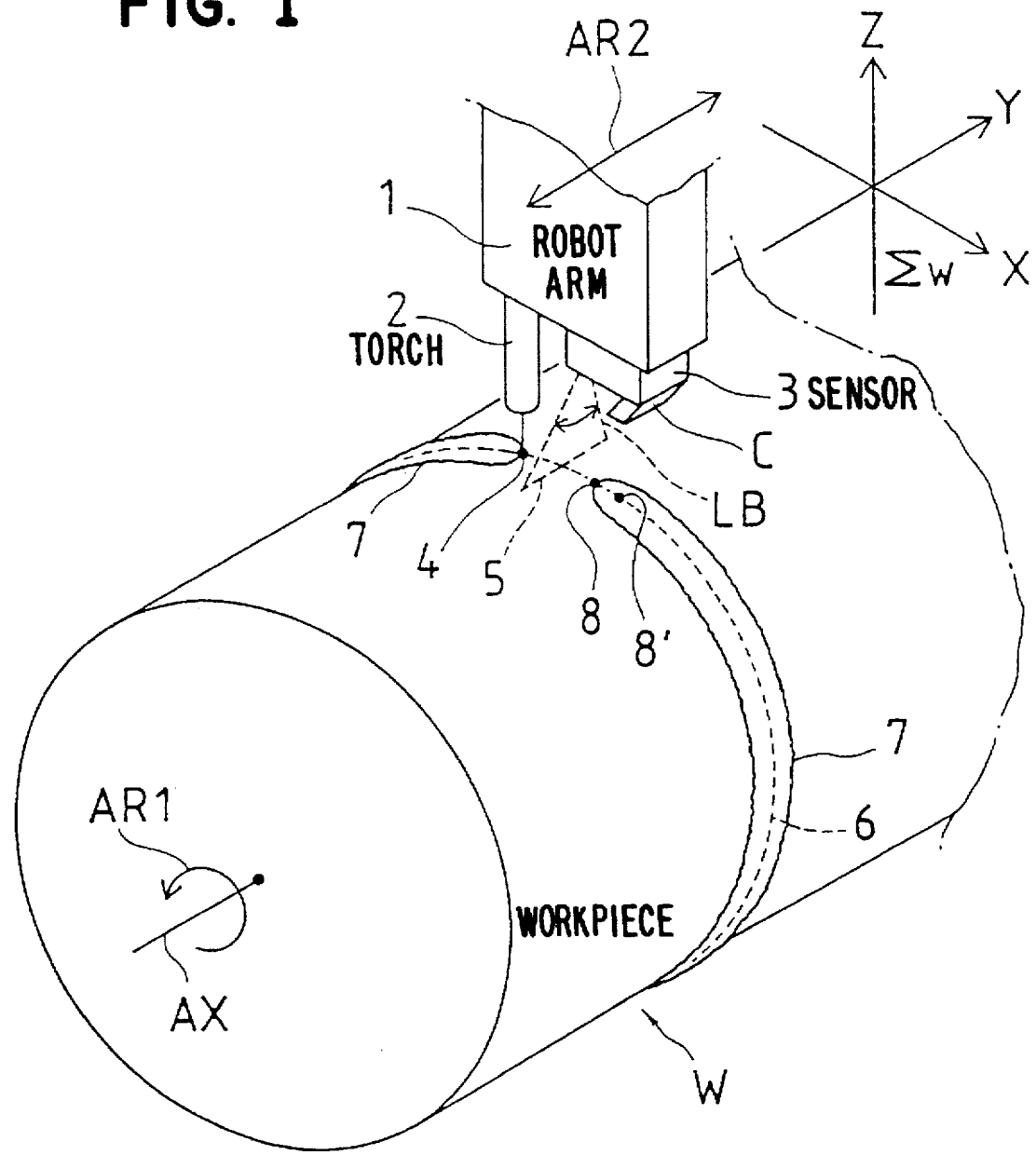
FIG. 1 is a view showing an arrangement of an arm end portion of a robot and a cylindrical workpiece according to the present invention, in which the robot is executing multi-layer welding based on fixed-position weaving, along the circumference of the workpiece.

FIG. 1 illustrates arc welding for a cylindrical workpiece W in its circumferential direction by a welding torch 2 which is attached to a distal end portion 1 of an arm of a robot.

The cylindrical workpiece W, as an object of welding, is supported for rotation around its axis in the direction of arrow AR1 of FIG. 1 by an external drive shaft, i.e., a drive shaft of a drive unit which is not controlled by a robot control device.

The welding torch 2 and a laser sensor 3 are attached to the robot arm end portion 1 by suitable mounting mechanisms. A point 4 on the extension of the axis of the welding torch 2 is set as a tool center point of the robot, and a move command for the robot is given by the coordinate value of the point 4 and the inclination of a tool coordinate system whose origin lies on the point 4. In the description to follow, the tool center point 4 will be referred to as a weld point.

A laser beam LB emitted from the laser sensor 3 is deflected and projected on the workpiece W so as to scan a region just ahead of the weld point 4 (region to be reached by the weld point 4 in a short time during robot operation), whereupon a light spot trace 5 is formed on the workpiece W and a weld layer, extending in a direction perpendicular to a welding center line 6. A CCD camera C which is attached to the laser sensor 3 picks up the light spot trace 5 from a direction oblique to a deflective scanning plane for the laser beam LB.

A work coordinate system $\Sigma_W$ composed of three rectangular axes X, Y and Z are set in the robot. In the example shown in FIG. 1, the X, Y and Z axes extend parallel to the tangent to the welding center line 6 on the weld point 4, the axis of rotation of the workpiece W or the direction of deflective scanning with the laser beam LB, and the axis of the welding torch 2, respectively.

In order to execute a weaving operation, the robot is controlled so that the weld point 4 repeatedly reciprocates in the direction of the Y axis on either side of a point (situated on the welding center line 6 on the workpiece W) on the work coordinate system $\Sigma_W$ at a predetermined cycle.

FIG. 1 shows where fixed-position weaving welding is carried out in a manner such that the robot reciprocates in the direction of arrow AR2 as it welds the workpiece W rotating in the direction of arrow AR1 about its axis. According to FIG. 1, welding is started from a position 8 on the welding center line 6 to form a weld layer (first layer) 7 with a predetermined width on either side of the center line 6, and now welding of one entire round of the workpiece W is almost completed, leaving an unwelded section of a short distance.

Figure 2:
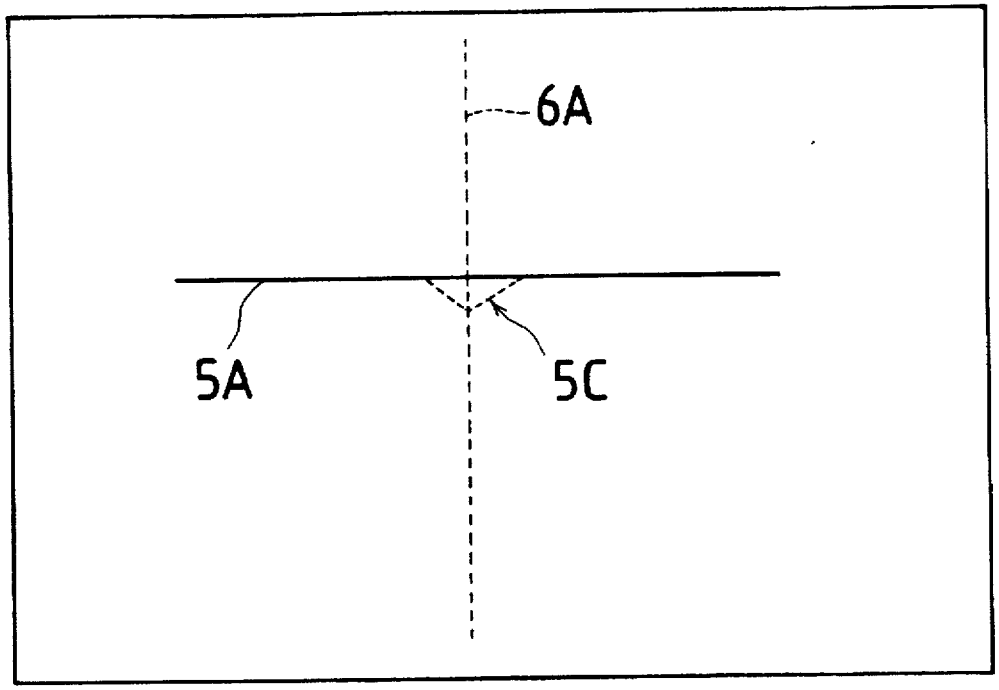
FIG. 2 is a diagram showing an image of an unwelded portion of the workpiece picked up by a CCD camera of a laser sensor in the state shown in FIG. 1.

FIG. 2 shows an image of the light spot trace 5 on the workpiece W picked up by the CCD camera C in the state shown in FIG. 1. In FIG. 1, the laser beam LB is projected on the unwelded surface of the workpiece W, thereby forming the straight light spot trace 5 in the Y-axis direction. Thus, an image of the light spot trace picked up by the camera C in this state is in the form of a straight line, as indicated by 5A in FIG. 2. In many cases, a butt joint portion of the workpiece W is cut into a concave form, and the concave portion appears as indicated by a dotted line 5C. A broken line 6A represents a position corresponding to the welding center line 6. During the weaving operation, the CCD camera C repeatedly reciprocates in the direction (indicated by arrow AR2 in FIG. 1) across the center line 6, so that the position (indicated by the broken line 6A) corresponding to the center line 6 on the image picked up by the camera C shifts from side to side.

Immediately after the workpiece W further rotates from the state of FIG. 1 so that the welding starting point 8 for the first layer reaches the range of projection of the laser beam LB, the image of the light spot trace 5 of the laser beam LB picked up by the CCD camera C has the shape of a straight line which is partially raised in the vicinity of the broken line 6A.

Figure 3:
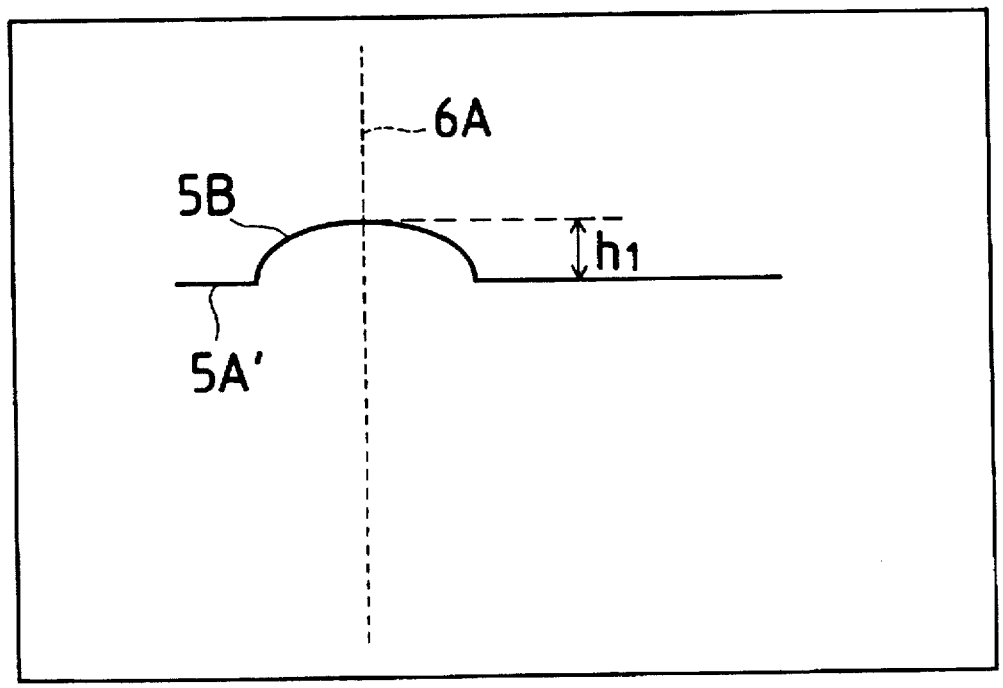
FIG. 3 is a diagram showing an image of a starting end portion of a first weld layer picked up by the camera after the workpiece is rotated in the forward direction from the position of FIG. 1.

The thickness of the weld layer increases as welding progresses along the welding center line 6 from the starting position 8, and is stabilized when reaching a certain position 8'. FIG. 3 shows an image of the light spot trace 5 picked up by the CCD camera C at the time when the position 8' is covered in the projection range of the laser beam LB by the rotation of the workpiece W.

In FIG. 3, a straight line 5A' indicates a portion of the workpiece W on which the weld layer is not deposited, while a raised portion 5B near the broken line 6A represents a profile of the weld layer on the YZ plane. Thus, a height h1 of the raised portion 5B can be detected on the basis of the straight line 5A', and this value can be converted into a raise height γ1.

Continuing welding while rotating the workpiece W, a second weld layer is deposited over the first weld layer, and a third weld layer over the second layer. In this manner, the raise height of the resulting weld layer is increased gradually.

Here α1, α2, . . . αn, are previously set as layer identification criteria in a manner such that the raise height γ1 of the first layer is given by α1<γ1≦α2, a raise height γ2 of the second layer is given by α2<γ2≦α3, and a raise height γn of an n'th layer is given by αn<αn≦n+1. Thereupon, if it is found that an actual raise height γj calculated from a raise height hj on the image is given by αk<γj ≦αk+1, where αk and αk+1 are layer identification criteria, the laser beam LB can be supposed to be currently incident upon a k'th weld layer. Thus, the point of time when αk+1 is exceeded by the value γj can be considered to be the time when the laser beam LB starts to be projected on the starting position for a k'th layer welding. In other words, it can be determined that a (k+1)'th layer welding is to be started soon if the operation is continued as it is. Accordingly, the welding conditions can be modified for the (k+1)'th layer welding during the time interval which elapses from the above determination time until the conclusion until the (k+1)'th layer welding is started.

Usually, the position of the welding torch 2 (i.e., position of the weld point 4) for the workpiece W is adjusted in accordance with the raise height of the weld layer. Thus, the position of the torch 2 is changed in the Z-axis direction when the next layer welding is started. Thereupon, the position of the CCD camera C, which is integral with the welding torch 2, also changes, so that shooting conditions of the camera C for the workpiece W, including the distance between the camera C and that region of the workpiece W (corresponding to the straight-line image 5A or 5A' in FIG. 2 or 3) on which the weld layer is not deposited, vary in some measure. Thus, in converting a raise height hn of on the image for the n'th layer into the raise height γn of the actual weld layer, the shooting conditions, including the position of the CCD camera during the execution of the n'th layer welding, must be taken into consideration.

Figure 4:
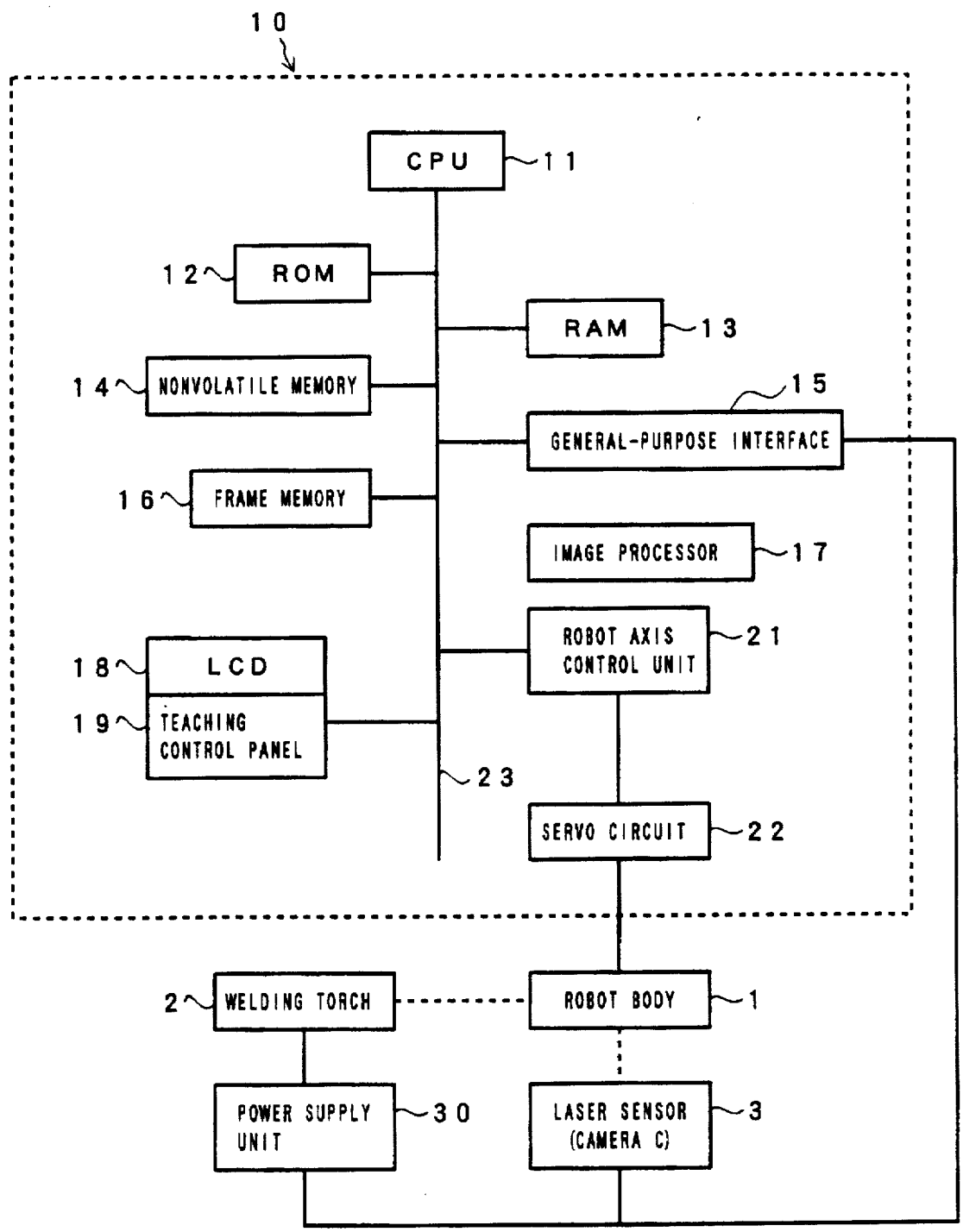
FIG. 4 is a block diagram showing an outline of a robot control system according to one embodiment of the invention.

FIG. 4 is a block diagram showing a robot control system according to one embodiment of the present invention. A robot control device 10 which constitutes the robot control system has a function to cause the robot to execute welding and a function to process images picked up by the CCD camera C which is attached to the robot.

The robot control device 10 includes a central processing unit (hereinafter referred to as CPU) 11. The CPU 11 is connected, by a bus 23, with a ROM 12, RAM 13, nonvolatile memory 14, general-purpose interface 15, frame memory 16, image processor 17, teaching control panel 19 with a liquid crystal display (LCD) 18, and robot axis control unit 21. The interface 15 is connected to the laser sensor 3, which is furnished with the CCD camera C and a power supply unit 30 for the welding torch 2. The control unit 21 is connected to the robot body 1 through a servo circuit 22.

The robot body (robot arm end portion) 1 is fitted with the laser sensor 3 which is composed of a laser beam projecting unit and the CCD camera C. The projection of the-laser beam LB and the shooting of the light spot trace of the laser beam LB by the camera C are carried out in accordance with commands from the CPU 11. An image signal picked up by the CCD camera C is converted into a gradation signal based on a gray scale by means of the general-purpose interface 15, and is stored in the frame memory 16. Image information read from the frame memory 16 is processed by the image processor 17.

The power supply unit 30 has a function to control welding voltage and welding current supplied to the welding torch in accordance with commands from the CPU 11.

The ROM 12 is loaded with various programs for the CPU 11 to control the robot body 1, laser 3, power supply unit 30, and robot control device 10 itself. These programs include a program for setting various conditions for the execution of multi-layer welding by screen entry and a program for obtaining the height hn of the build-up of the light spot trace image by analyzing the image and converting the height hn into the build-up thickness γn of the weld layer. The RAM 13 is a memory which can be utilized for temporary storage and computation of data.

The nonvolatile memory 14 is loaded with various programs and parameter set values which are used to settle the details of operation of the robot control system. These programs or values include a program for continuously detecting the progress of formation of the weld layer by the laser sensor 3 during welding operation, thereby discriminating the layer, a program including instructions for control commands associated with transition to next weld layer based on the set conditions, and relevant set values. The contents of processing based on these programs will be mentioned later.

The following preliminary operations are performed before executing multi-layer welding based on weaving. The following is a description of a case in which multi-layer fixed-position weaving welding for first three layers is executed with use of the arrangement shown in FIG. 1.

(1) First, the teaching control panel 19 is operated to call a fixed-position weaving condition list picture, such as the one shown in FIG. 5, on the screen of the LCD 18, and basic execution conditions for fixed-position weaving are set by screen entry.

In the picture shown in FIG. 5, "LAYER NUMBER" represents the number of weld layers to be piled up. In the illustrated example, conditions are set for multilayer welding for first three layers. "ALLOWABLE VALUE" represents a minimum value (in millimeters) of the change of the raise height which would allows an operator to determine that the next layer welding is started. The change of the raise height is a value which is converted in accordance with some camera shooting conditions, such as the height of a build-up profile in an image picked up by the CCD camera C and the position of the camera C.

Referring to FIG. 5, $\beta 1=2.0$ mm, $\beta 2=1.5$ mm, and $\beta 3=1.2$ mm are set to produce the following effects. When the CCD camera C detects a raise height exceeding $\beta 1=2.0$ mm, with respect to the unwelded portion, in a laser beam incident position just ahead of the position of the welding torch 2, while a first layer welding is being executed, it is concluded that a second layer welding is just on the edge of being started. Subsequently, when the camera C detects a change of the raise height exceeding $\beta 1+\beta 2=3.5$ mm in the process of execution of the second layer welding, it is concluded that a third layer welding is just on the edge of being started. When the CCD camera C then detects a change of the raise height exceeding $\beta 1+\beta 2+\beta 3=4.7$ mm in the process of execution of the third layer welding, it is concluded that the third layer welding is just on the edge of being finished.

(2) Further, the teaching control panel 19 is operated again to call a fixed-position weaving condition detail picture, such as the one shown in FIG. 6, on the screen of the LCD 18, and detailed execution conditions for fixed-position weaving are set by screen entry.

In the picture shown in FIG. 6, "CONDITION" represents a number assigned to the set condition concerned. In the illustrated example, the number is 1. "LAYER NUMBER" represents the number of layers to be set in the condition. In the illustrated example, conditions are set for the multi-layer welding for the three layers. For "ALLOWABLE VALUE," the layer identification criteria $\beta 1$, $\beta 2$ and $\beta 3$ set in the fixed-position weaving condition list picture are displayed automatically.

"CORRECTION FOR FIRST-TO-SECOND LAYER TRANSITION" represents a necessary correction of the robot position (correction from an instructive position) for the transition from the first to the second layer welding. In the case where, for example, the first layer welding is carried out in the instructive position and the second layer welding is carried out with taught position shifted by 2.1 mm only in the Z-axis direction of the work coordinate system $\Sigma_W$ (see FIG. 1), x2=y2=0 and z3=2.1 are set. Likewise, "CORRECTION FOR SECOND-TO-THIRD LAYER TRANSITION" represents a necessary correction of the robot position (correction from the instructive position) for the transition from the second layer welding to the third layer welding.

"FIRST-LAYER CONDITION" defines a welding voltage V1 and a welding current I1 for the first pass. Likewise, "SECOND-LAYER CONDITION" AND "THIRD-LAYER CONDITION" define welding voltages V2 and V3 and welding currents I2 and I3 for the second and third passes, respectively.

(3) The welding operation is started after setting the values in the aforementioned manner. FIG. 7 shows an operation program for the robot operation and welding conditions for this case.

In the instruction statements in the first, second, and fourth lines of FIG. 7, "[1]" defines data for the robot position for the start of the welding operation. In the seventh-line statement, "[2]" defines position data for an air-cut point on which the robot is situated at a suitable distance from the workpiece W.

Processing executed by the CPU 11 of the robot control device 10 includes a main process for controlling the robot and the power supply unit 30 and a sub-process for detecting the progress of welding layer formation to discriminate layers.

Figure 8:
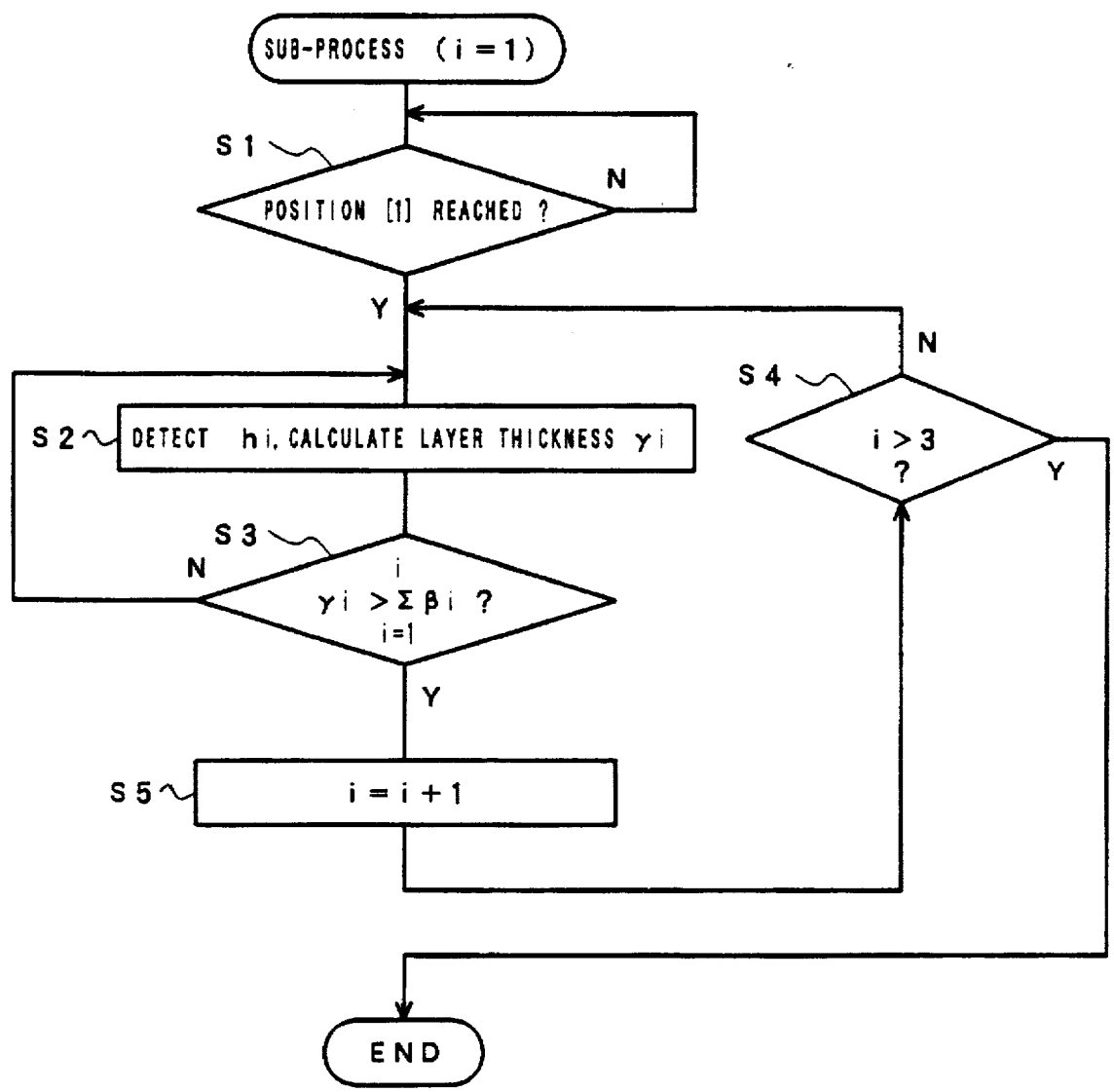
FIG. 8 is a flowchart showing an outline of a sub-process according to the one embodiment of the invention.
Figure 9:
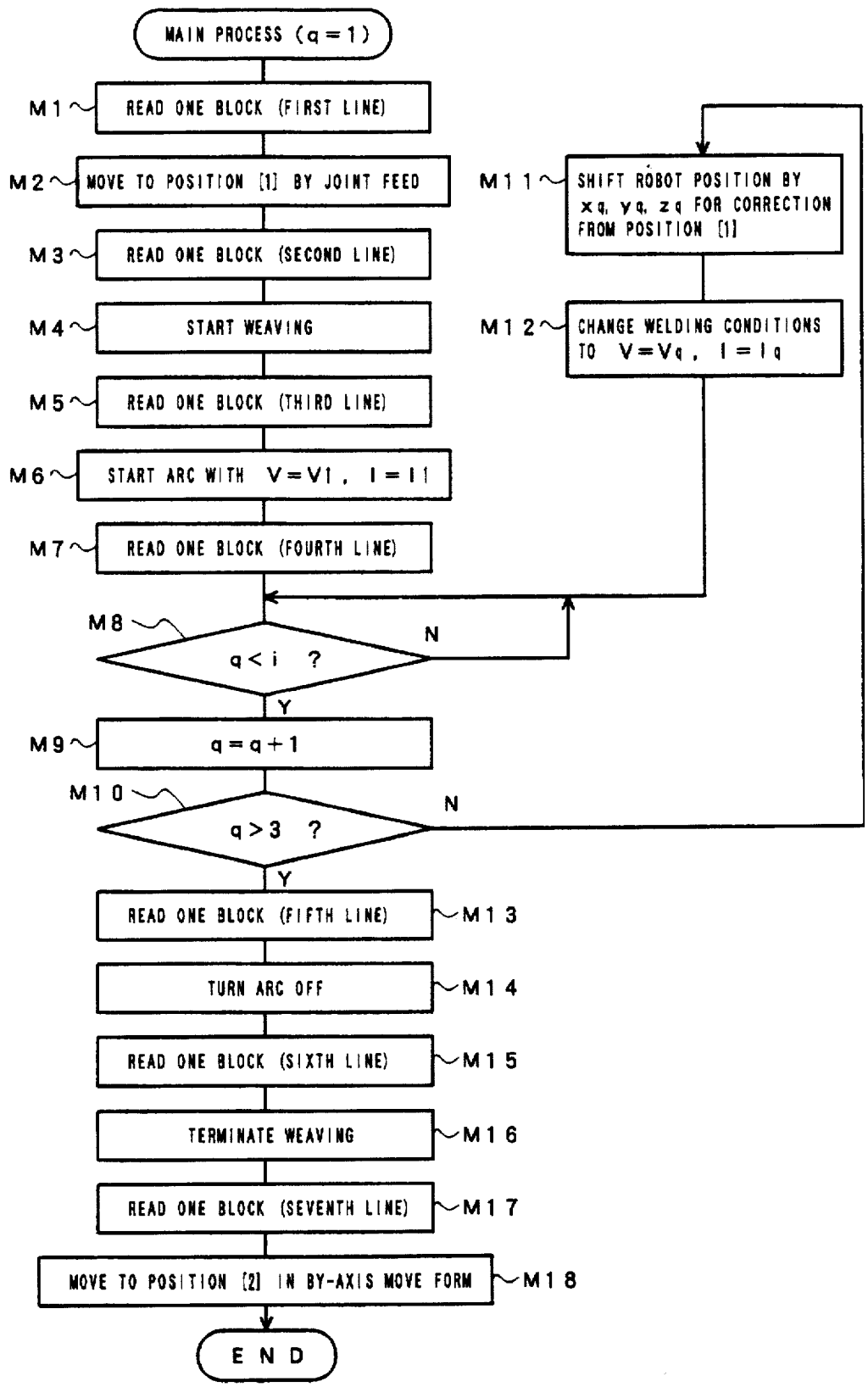
FIG. 9 is a flowchart showing an outline of a main process according to the one embodiment of the invention.

The flowchart of FIG. 8 shows an outline of the sub-process. The sub-process is started simultaneously with the following main process in a manner such that a layer discrimination index i set in a suitable register is initialized for i=1.

When the arrival of the robot at the position "[1]" for the start of the welding operation is first detected (Step S1), the laser sensor 3 is activated with the progress of the first layer welding, and the laser beam LB is projected on a point ahead of the weld point 4. The CCD camera C picks up the light spot trace 5 produced by the laser beam LB. The image picked up by the camera C is processed by the robot control device 10, and a height hi (height h1 at the beginning) of the build-up profile of the tight spot trace on the image is detected and converted into a raise height γi (height γ1 at the beginning) of the weld layer (Step S2).

While the first layer welding is being executed in this manner, the processing of Steps S3 and S2 is repeated at predetermined cycles unless the allowable value β1 for the first layer set in the picture of FIG. 5 is exceeded by the height γ1 of the weld layer converted by the image processing.

When it is concluded in Step S3 that β1 is exceeded by the raise height γ1 of the weld layer, i is incremented by 1 to establish i=2, so that it is confirmed that the value i is not higher than the layer number (=3). Thereupon, the program returns to Step S2.

Thereafter, the second layer welding is executed with the index i=2, and the processing of Step S2 and the subsequent steps is carried out. In Step S2, a build-up profile height h2 of the light spot trace on the image is detected and converted into an overall raise height γ2 of the weld layer. Then, it is determined whether or not the converted overall raise height γ2 is greater than the sum [β1+β2] of the allowable values β1 and β2 for the first and second layers. The processing of Steps S3 and S2 is repeated at the predetermined cycles unless [β1+β2] is exceeded by the height γ2. When γ2 exceeds [β1+β2], i=2+1=3 is established (Step S5), upon confirming that the value i is smaller than 4, the program returns again to Step S2.

Thereafter, the third layer welding is executed with the index i=3, and the processing of Step S2 and the subsequent steps are carried out in the same manner as aforesaid. In Step S2, a raise profile height h3 of the light spot trace on the image is detected and converted into an overall raise height γ3 of the weld layer. Then, it is determined whether or not the converted overall build-up height γ3 is greater than the sum [β1+β2+β3] of the allowable values β1, β2 and β3 for the first, second, and third layers. The processing of Steps S3 and S2 is repeated at the predetermined cycles unless [β1+β2+β3] is exceeded by the height γ3. When γ3 exceeds [β1+β2+β3], i=3+1=4 is established (Step S5), upon confirming that the value i is greater than 3, this process is terminated.

Thus, according to the sub-process described above, the point of time when [β1+β2+ . . . +βi] is exceeded by γi with the index i for the first time in Step S3 can be recognized as the time just before the completion of an i'th layer welding, that is, the time when a next layer welding or an (i+1)'th layer welding is just on the edge of being started. Accordingly, this function of the sub-process is utilized for the main process described below.

The main process is started the moment the rotation of the workpiece W is started after 1 is set as an initial value of a layer transition index q in a suitable register.

First, the first line of the operation program shown in FIG. 7 is read (Step M1), and the robot moves to the position [1] in a joint-feed mode (Step M2). Then, the second line of the operation program is read (Step M3), and weaving is started in a mode assigned by sine [1] (Step M4).

Subsequently, the third line of the operation program is read (Step M5), and the welding torch 2 is supplied with electric power from the power supply unit 30 under conditions including the welding voltage V1 and the welding current I1, whereupon arc welding for the first layer is started (Step M6). Further, a move command for the position [1], the fourth line of the operation program, is read (Step M7).

After the fixed-position weaving welding is started in this manner, the layer discrimination index i for the sub-process starts to be monitored continuously. At the start of the fixed-position weaving welding, q=1 and i=1 are given. Before the first layer welding is finished (more specifically, when the second layer welding is just on the edge of being started), as mentioned before, the index i changes to 2. Since there is a relation q (=1) i (=2) at this point of time (Step M8), 1 is added to the value q so that the value of the index q is equal to that of the index i (Step M9).

After confirming that the total layer number (=3) is not exceeded by the updated value (=2) of the index q yet (Step M10), the robot position is shifted from an initial taught position by x2 in the X-direction, y2 in the Y-direction, and z2 in the Z-direction of the work coordinate system $\Sigma_W$ (see item 4 of FIG. 6) (Step M11). Moreover, the welding voltage and current as the welding conditions for the second layer are changed from V1 to V2 and from I1 to I2, respectively (see item 7 of FIG. 6) (Step M12).

When necessary processing for the transition from the first to the second layer welding is carried out in Steps M1 and M12 in this manner, the program returns to Step M8, whereupon arrangements are completed to monitor the transition to the second layer welding while executing the first layer welding. Thus, the layer discrimination index i for the sub-process starts to be monitored continuously. When the second layer welding is just on the edge of being finished, the value of the index i for the sub-process changes from 2 to 3, so that a relation q (=2)<i (=3) is established (Step M8). Then, 1 is added to the value of the index q (Step M9). After confirming that 3 is not exceeded by the value q (=3) (Step M10), necessary processing for the transition from the second to the third layer welding is carried out (Steps M11 and M12). Thus, the robot position is shifted from an initial current position by x3 in the X-direction, y3 in the Y-direction, and z3 in the Z-direction of the work coordinate system $\Sigma_W$ (see item 5 of FIG. 6) (Step M11). Moreover, the welding voltage and current as the welding conditions for the third layer are changed to V3 and I3, respectively (see item 8 of FIG. 6) (Step M12).

When the third layer welding is substantially completed, the CCD camera C starts to find the light spot trace 5 on the third weld layer in the sub-process. Thus, the layer discrimination index i becomes i=4 in Step S5 of the sub-process. Thereupon, a relation q (=3)<i (=4) is established (Step M8). Then, 1 is added to the value of the index q (Step M9), so that the value q (=4) exceeds 3 (Step M10). Accordingly, a fifth line of the operation program is read (Step M15), and the arc is turned off by means of the power supply unit 30 (Step M14).

Subsequently, a sixth line of the operation program is read (Step M15), and the weaving is finished (Step M16). Further, a seventh line of the operation program is read (Step M17), and the robot is moved to the position [2] at a distance from the workpiece by moving its individual axes (Step M18), whereupon the process is terminated.

Since a sensing region of the laser sensor 3 is situated just ahead of the weld point 4 on the welding center line, as shown in FIG. 1, there is a short time lag between the time when the sensing region moves to the next weld layer and the time when the weld point 4 moves to the next weld layer. Therefore, correction of the robot position, change of the welding conditions, etc. for the next layer welding can be effected by utilizing this time lag. The time lag is settled depending on the distance between the weld point 4 and the sensing region of the laser sensor 3 and the speed of movement of the robot along the welding center line with respect to the workpiece W. If the time lag thus settled is not long enough to correct the robot position and change the welding conditions for the next layer welding, standby time for adjusting the time lag may possibly be set as an operator likes using the condition setup picture, as shown in FIG. 6.

In the embodiment described above, the multi-layer weaving welding is executed for the peripheral surface of a rotating cylindrical workpiece, as shown in FIG. 1. According to the present invention, however, there are no special restrictions on the shape and motion of the workpiece, regions for welding, etc. It is to be understood that the aforesaid condition setting, teaching operation, processing procedure, etc. require no substantial changes if the present invention is applied to a case in which a plate-like workpiece is repeatedly translated as it is subjected to the multi-layer fixed-position weaving welding, for example.

Although the raise height is detected by the laser sensor according to the embodiment described herein, moreover, it may be also detected by using various other detecting devices. For example, the raise height may be detected by measuring the distance from the point of incidence of the laser beam in accordance with the output of a position sensing detector (PSD), which utilizes the principle of triangulation using a laser displacement sensor.

What is claimed is:

1. A robot control method for multi-layer welding, in which multi-layer welding is executed using a robot control device to control a robot, a welding torch supported by the robot, means for moving a welding object with respect to the robot, and a sensor for detecting the progress of formation of a weld layer on the welding object, comprising the steps of:

(a) continuously detecting a progress of formation of a weld layer in a region situated a short distance ahead of a location in a welding object where a welding operation is currently performed, with respect to an advancing direction of the welding operation, using the sensor;

(b) concluding that a detecting area of the sensor has shifted from one weld layer or unwelded layer to a next new weld layer when the progress of formation of the weld layer, detected by the sensor, exceeds a predetermined level; and (c) making preparations for a termination of the welding operation when concluded in the step (b) that the next new weld layer is a final one, or changing welding conditions into welding conditions for the next new weld layer when concluded in the step (b) that the next new weld layer is not a final one.

2. A robot control method according to claim 1, wherein said robot executes a weaving operation by repeatedly reciprocating for a predetermined width in a direction across a moving direction of the welding object on either side of a point.

3. A robot control method for multi-layer welding, in which multi-layer welding is executed using a robot control device to control a robot, a welding torch supported by the robot, a sensor supported by the robot and used to detect the progress of formation of a weld layer on a welding object, and means for moving the welding object with respect to the robot, comprising the steps of:

(a) detecting a region situated a short distance ahead of a location in a welding object where a welding operation is currently performed, with respect to an advancing direction of the welding operation, using the sensor;

(b) concluding that a detecting area of the sensor has shifted from one weld layer or unwelded layer to a next new weld layer when the progress of formation of the weld layer, detected by the sensor, exceeds a predetermined level; and (c) making preparations for a termination of the welding operation when concluded in the step (b) that the next new weld layer is a final one, or changing the position of the robot and welding conditions into welding conditions for the next new weld layer when concluded in the step (b) that the next new weld layer is not a final one.

4. A robot control method according to claim 2, wherein said robot executes a weaving operation by repeatedly reciprocating for a predetermined width in a direction across a moving direction of the welding object on either side of a point.

5. A robot control system for multi-layer welding, comprising:

a robot having a welding torch on a distal end thereof and a sensor to detect a raise height of a weld layer on a cylindrical welding object in a manner such that an object of detection is a region situated a short distance ahead of a location where welding is being performed through the welding torch, with respect to an advancing direction of the welding operation;

means for supporting the cylindrical welding object for rotation around an axis thereof and rotating the cylindrical welding object around the axis thereof at a predetermined speed; and a robot control device to control a position and an operation of the robot and to provide welding conditions to the robot, said robot control device including:

means for reciprocating the robot with a predetermined amplitude of vibration in the axial direction of the welding object on either side of a specific point and in predetermined cycles, means for continuously determining the raise height of the weld layer detected by the sensor and outputting a weld layer transition signal when it is determined that the raise height exceeds a predetermined level, and means for changing the welding conditions, including a welding current and a welding voltage, into welding conditions for a subsequent layer and updating the specific point of the robot for a position corresponding to the subsequent layer after a passage of a predetermined time when the weld layer transition signal is outputted.

6. A robot control system according to claim 5, wherein said sensor includes:

laser beam projecting means for projecting a laser beam on the welding object while deflecting the laser beam in the axial direction of the welding object, and a CCD camera to pick up an image of a light spot trace formed by the laser beam on the welding object, the image picked up by the CCD camera being processed in the robot control device to be used for the detection of the raise height of the weld layer.

* * * * *

UNITED STATES PATENT AND TRADEMARK OFFICE
CERTIFICATE OF CORRECTION

PATENT NO. : 5,715,375
DATED : February 3, 1998
INVENTOR(S) : Takayuki ITO, et al.

It is certified that error appears in the above-indentified patent and that said Letters Patent is hereby corrected as shown below:

Column 4

Line 35, "$\alpha n < \alpha n \leq n+1$" should be 

Column 10

Line 2, "claim 2," should be --claim 3,--.

Signed and Sealed this

Eleventh Day of August 1998

Attest:

BRUCE LEHMAN

Attesting Officer

Commissioner of Patents and Trademarks